US009703488B2

(12) United States Patent
Guttahalli Krishna et al.

(10) Patent No.: US 9,703,488 B2
(45) Date of Patent: *Jul. 11, 2017

(54) AUTONOMOUS DYNAMIC OPTIMIZATION OF PLATFORM RESOURCES

(71) Applicant: International Business Machines Corporation, Armonk, NY (US)

(72) Inventors: Anjan Kumar Guttahalli Krishna, Hyderabad (IN); Edward C. Prosser, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/839,542

(22) Filed: Aug. 28, 2015

(65) Prior Publication Data

US 2016/0224389 A1    Aug. 4, 2016

Related U.S. Application Data

(63) Continuation of application No. 14/612,564, filed on Feb. 3, 2015, now Pat. No. 9,483,315.

(51) Int. Cl.
*G06F 12/00* (2006.01)
*G06F 3/06* (2006.01)
(Continued)

(52) U.S. Cl.
CPC ............ *G06F 3/0605* (2013.01); *G06F 3/061* (2013.01); *G06F 3/0631* (2013.01);
(Continued)

(58) Field of Classification Search
CPC .... G06F 12/00; G06F 12/0646; G06F 3/0629; G06F 3/0644
(Continued)

(56) References Cited

U.S. PATENT DOCUMENTS

| 8,145,872 | B2 | 3/2012 | Shah et al. |
| 8,429,276 | B1 | 4/2013 | Kumar et al. |
| 8,990,527 | B1 * | 3/2015 | Linstead ............... G06F 3/0617 |
| | | | 711/161 |
| 9,003,037 | B2 | 4/2015 | Beveridge |
| 9,311,194 | B1 | 4/2016 | Cypher et al. |
| 2003/0065873 | A1 | 4/2003 | Collins et al. |
| 2006/0242431 | A1 | 10/2006 | LeCrone et al. |
| 2007/0168635 | A1 | 7/2007 | Allen et al. |
| 2008/0028408 | A1 | 1/2008 | Day et al. |

(Continued)

FOREIGN PATENT DOCUMENTS

EP    1089173 B1    3/2010

OTHER PUBLICATIONS

U.S. Patent and Trademark Office, Office Action issued in related U.S. Appl. No. 14/612,564 dated Apr. 22, 2016.

(Continued)

*Primary Examiner* — Tuan Thai
(74) *Attorney, Agent, or Firm* — Middleton Reutlinger (57) ABSTRACT

Methods for dynamically optimizing platform resource allocation of a logically-partitioned data processing system. Processor and memory resources are allocated to logical partitions of the data processing system. After allocating the processor and memory resources to the plurality of logical partitions, local and non-local memory accesses are monitored for the logical partitions. Based at least in part on the local and non-local memory accesses, a determination is made whether to reallocate the processor and memory resources of the logical partitions. Responsive to determining to reallocate the processor and memory resources, the processor and memory resources are dynamically reallocated to the logical partitions of the data processing system.

15 Claims, 5 Drawing Sheets

(51) Int. Cl.
    *G06F 9/50*         (2006.01)
    *G06F 12/02*       (2006.01)
    *G06F 9/455*      (2006.01)

(52) U.S. Cl.
    CPC .......... *G06F 3/0644* (2013.01); *G06F 3/0653* (2013.01); *G06F 3/0664* (2013.01); *G06F 3/0665* (2013.01); *G06F 3/0673* (2013.01); *G06F 9/45558* (2013.01); *G06F 9/5016* (2013.01); *G06F 9/5077* (2013.01); *G06F 12/023* (2013.01); *G06F 2009/45583* (2013.01); *G06F 2212/1044* (2013.01)

(58) Field of Classification Search
    USPC .......................... 711/100, 154, 170, 173, 200
    See application file for complete search history.

(56) References Cited

U.S. PATENT DOCUMENTS

2008/0168457 A1*   7/2008   Accapadi .............. G06F 9/5077
                                                                     718/104

OTHER PUBLICATIONS

List of IBM Patents or Patent Applications Treated As Related.
Goes, Luis Fabricio Wanderley et al., "Automatic Skelton-Driven Memory Affinity for Transactional Worklist Applications," International Joural of Parallel Programming, May 2013.
U.S. Patent and Trademark Office, Notice of Allowance issued in related U.S. Appl. No. 14/612,564 dated Jul. 15, 2016.

\* cited by examiner

AUTONOMOUS DYNAMIC OPTIMIZATION OF PLATFORM RESOURCES

CROSS-REFERENCE TO RELATED APPLICATIONS

This application is a continuation of U.S. patent application Ser. No. 14/612,564, filed on Feb. 3, 2015 by Anjan Kumar Guttahalli Krishna et al., and entitled AUTONOMOUS DYNAMIC OPTIMIZATION OF PLATFORM RESOURCES, the entire disclosure of which is incorporated by reference herein.

FIELD OF THE INVENTION

The present invention relates to computing systems, and more particularly to logically partitioned data processing systems and the allocation of hardware resources thereto.

BACKGROUND OF THE INVENTION

Modern requirements for a computer system may require that a computer be utilized to run several operating environments, or operating systems, at once. In a typical embodiment, a logically partitioned data processing system may run a plurality of operating systems in one or more logical partitions. Each operating system resides in a logical partition, with each logical partition allocated at least part of a processor, an entire processor, or multiple processors from the computer. Additionally, a portion of the system's memory resources may be allocated to each logical partition. The logical partitions may be under the control of a partition manager and/or hypervisor. The partition manager and/or hypervisor may correspond to a part of system firmware and software that manages an allocation of resources to the operating systems and logical partitions as well as tasks to be performed by each logical partition. Over time, resource allocation may become sub-optimal (i.e., less than optimal) for one or more logical partitions, which may lead to decreases in processing efficiency and speed.

Consequently, there is a continuing need for improving logical partition resource allocation management.

SUMMARY OF THE INVENTION

Embodiments of the invention provide for methods that dynamically optimize platform resource allocation of a logically-partitioned data processing system. Processor and memory resources may be allocated to a plurality of logical partitions in the logically-partitioned data processing system. After allocation, local and non-local memory accesses by the plurality of logical partitions may be monitored. Based at least in part on the local and non-local memory accesses, embodiments of the invention may determine whether to reallocate the processor and memory resources for the plurality of logical partitions. In response to determining to reallocate the processor and memory resources for the plurality of logical partitions, the processor and memory resources may be dynamically reallocated to the plurality of logical partitions in the logically partitioned data processing system.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Embodiments of the invention provide systems, methods, and computer program products that may dynamically reallocate processor and/or memory resources in a logically-partitioned data processing system. In general, each logical partition in a data processing system may be allocated processor and memory resources of the data processing system. The allocation of processor and memory and resources may become sub-optimal due to system changes, such as dynamic logical partition operations that add/remove processor and memory resources, live partition mobility (e.g., logical partition relocation), logical partition hibernation, suspend, and/or resume, dynamic creation/deletion of partitions, processor and/or memory resource configuration changes, and/or processing node repair and/or add, among others.

Consistent with some embodiments of the invention, dynamic reallocation of processor and memory resources may restore processor-memory affinity such that a data processing system's performance may be returned from a sub-optimal configuration to a configuration that attempts to optimize performance and/or efficiency of the data processing system. In general, determining an optimal resource allocation may be based at least in part on the configuration of processor and memory resources for each logical partition, available hardware resources of the data processing system, and/or hardware resource requirements for various software components executing on the data processing system. Embodiments of the invention may perform a sequence of operations that reallocate/relocate processor and/or memory resources to logical partitions to thereby optimally allocate resources of the data processing system.

It will be appreciated that "optimal," within the context of the invention, does not necessarily require that a particular resource allocation is the absolute "best" allocation possible, or that a single "best" allocation is even possible. Resource allocation in some embodiments, for example, may involve making tradeoffs to balance performance among multiple logical partitions, and to some extent may be based upon a prediction of expected workloads that may not match up exactly with actual workloads. Furthermore, given that the workloads of individual logical partitions may vary over time in many embodiments, the degree at which a particular resource allocation is optimal may vary as well. As such, a "sub-optimal" resource allocation in some embodiments may generally refer to a resource allocation that results in or is at least expected to result in reduced performance relative to the resource allocation that was made in a prior allocation operation.

Numerous variations and modifications will be apparent to one of ordinary skill in the art, as will become apparent from the description below. Therefore, the invention is not limited to the specific implementations discussed herein.

Hardware and Software Environment

Figure 1:
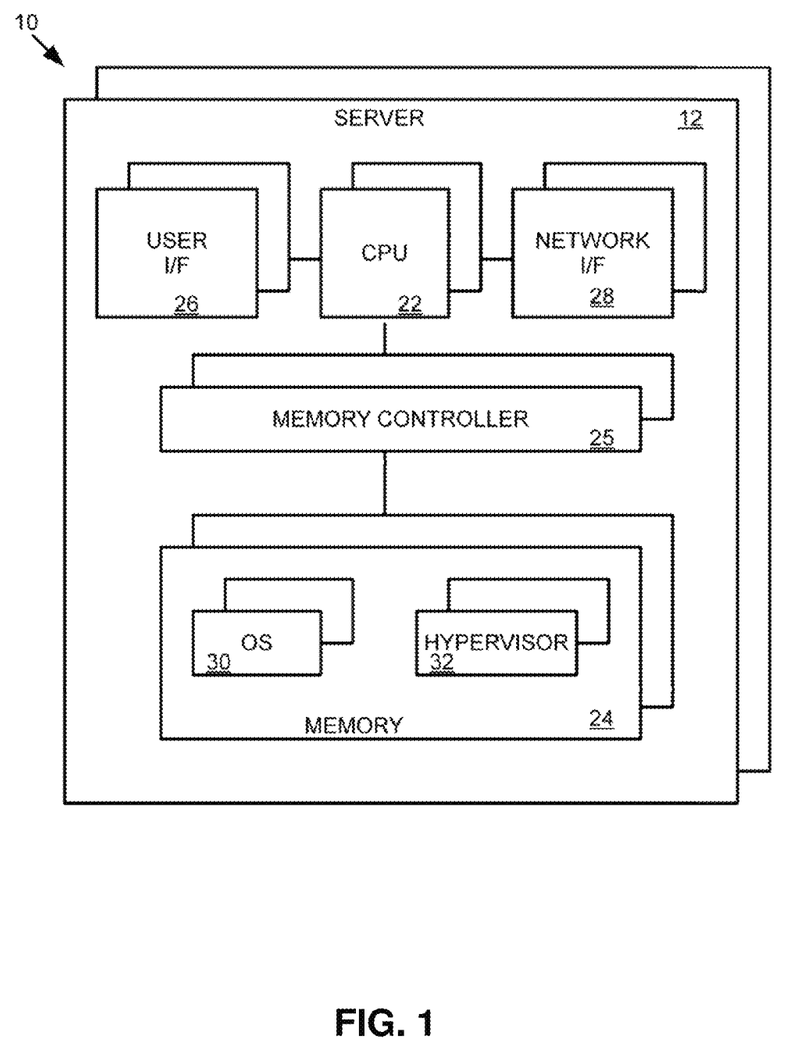
FIG. 1 provides a block diagram of a hardware components of a data processing system that may be logically partitioned consistent with embodiments of the invention.

Turning now to the figures and particularly to FIG. 1, this figure provides a block diagram illustrating components of a data processing system 10 consistent with some embodiments of the invention. As shown, the data processing system 10 includes one or more servers 12 that comprise one or more processors 22 including at least one hardware-based microprocessor and one or more memory resources 24 coupled to the at processors 22. The memory resources 24 may comprise memory modules and many include, for example, random access memory (RAM) devices comprising the main storage of the data processing system 10, as well as any supplemental levels of memory, e.g., cache memories, non-volatile or backup memories (e.g., programmable or flash memories), read-only memories, etc. In addition, memory resources 24 may be considered to include memory storage physically located elsewhere in the data processing system 10, e.g., any cache memory in a microprocessor, as well as any storage capacity used as a virtual memory, e.g., as stored on a mass storage device or on another computer coupled to the data processing system 10. In general, memory resources 24 may be organized into one or more memory pages and/or memory locations that may be distributed among one or more memory modules configured in the data processing system 10. As shown, one or more memory controllers 25 may connect the one or more processors 22 to the memory resources 24 and thereby facilitate memory accesses to memory resources 24 by the processors 22.

As will become more apparent below, the access time for different memory modules may vary for different processors, e.g., in data processing systems incorporating a non-uniform memory access (NUMA) architecture, such that performance is generally improved for a particular task when data used by a particular processor handling that task is stored in a memory module having a relatively short access time for that particular processor. Generally, a processor and memory having an associated short access time may be considered to have a higher processor-memory affinity as compared to a processor and memory having an associated longer access time. Consistent with some embodiments of the invention, a processor resource and a memory resource having a short access time may be considered locally associated, while a processor resource and memory resource having a relatively longer access time may not be considered locally associated. Hence, a local memory access for a memory resource is generally associated with a processor resource having a short access time, and a non-local memory access for a memory resource is generally associated with a processor resource having a relatively longer access time.

For interface with a user or operator, the data processing system 10 may include a user interface 26 incorporating one or more user input/output devices, e.g., a keyboard, a pointing device, a display, a printer, etc. Otherwise, data may be communicated to and from another computer or terminal over a network interface 28 coupled to a communication network (e.g., the Internet, a local area network, a wide area network, a cellular voice/data network, one or more high speed bus connections, and/or other such types of communication networks). The data processing system 10 also may be in communication with one or more mass storage devices, which may be, for example, internal hard disk storage devices, external hard disk storage devices, external databases, storage area network devices, etc.

For a logically-partitioned data processing system 10, the data processing system may operate under the control of one or more operating systems 30 and may execute or otherwise rely upon various computer software applications, components, programs, objects, modules, engines, data structures, etc. Moreover, the data processing system may include one or more instances of a hypervisor 32, where such hypervisors 32 generally manage execution of the operating systems 30 on the physical resources (e.g., processors 22 and memory 24) by virtualizing the physical resources into virtualized hardware resources. For instance, a hypervisor 32 may intercept requests for resources from operating systems 30 to globally share and allocate resources. The hypervisor 32 may allocate physical processing cycles of shared processor 22 resources by way of virtual processors for a logical partition.

In general, each server 12 may comprise one or more processing nodes, where each processing node may be configured with one or more processors 22, one or more memory resources 24, one or more memory controllers 25 and/or other such hardware resources (e.g., network interface adapters, high speed communication bus adapters, etc.). Therefore, a processor 22 may be considered local to a memory resource 24 configured on a common processing node. The processor 22 may be considered non-local to memory resources 24 not configured on the same processing node. Generally, a processor 22 and memory resources 24 configured locally generally have a higher processor-memory affinity compared to the processor 22 and memory resources 24 configured non-locally, where a processor-memory affinity describes an efficiency with which a processor 22 may access and/or use the memory resource 24. Therefore, in general, a processor 22 may access (to write data to and/or read data from) a locally configured memory resource 24 with a shorter response time (i.e., faster).

Figure 2:
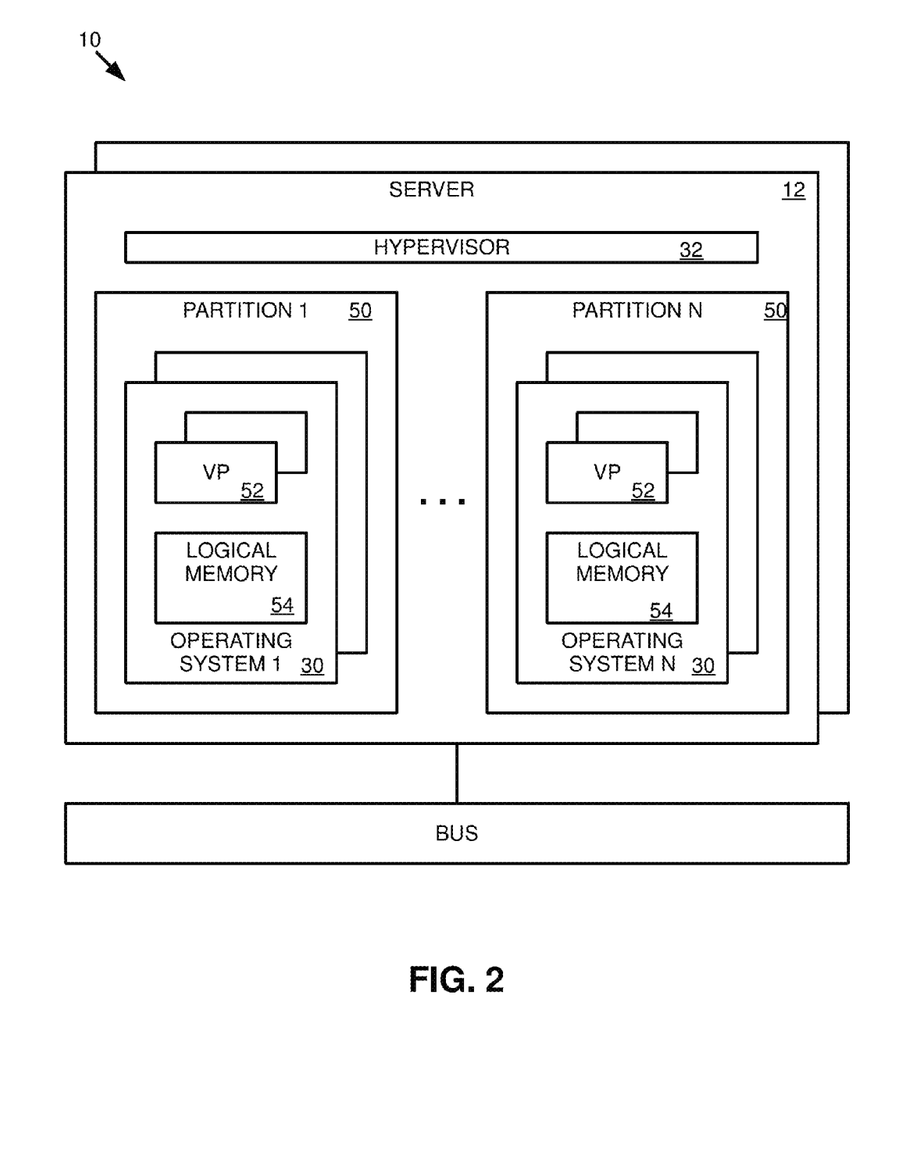
FIG. 2 provides a block diagram of a logical partition configuration that may be implemented on the data processing system of FIG. 1.

FIG. 2 provides a block diagram of a virtual processing environment that may be implemented in the data processing system of FIG. 1. In FIG. 2, system 10 includes software components and resources that implement a logically partitioned processing environment consistent with embodiments of the invention. As such, FIG. 2 may include a computing architecture characterized as a virtual machine design, such as virtual machine designs developed by International Business Machines Corporation. As shown, the data processing system 10 includes one or more servers 12 implementing plurality of logical partitions 50 (labeled 'PARTITION 1' and 'PARTITION N') that may share processing resources of one or more processors 22 configured in one or more servers 12.

As shown, each logical partition 50 may host one or more operating systems 30 (labeled 'OPERATING SYSTEM 1' and 'OPERATING SYSTEM N'), where each operating system 30 may be allocated one or more virtual processors (labeled 'VP') 52 and logical memory 54. In general, the processors 22 of the one or more servers 12 may execute software configured to simulate multiple virtual processors 52. In addition, the logical partitions 50 may logically comprise a portion of the data processing system's 10 memory 24 and/or other resources, which may be referred to as the logical memory 54 of a logical partition 50 that may be allocated to one or more operating systems 30 hosted on the logical partition 50. Each operating system 30 may control the primary operations of its logical partition 50 in a manner similar to the operating system of a non-partitioned computer. Each logical partition 30 may execute in a separate memory space, represented by logical memory 54. Moreover, each logical partition 30 may be statically and/or dynamically allocated a portion of the available resources in the data processing system 10. For example and as discussed herein, each logical partition 30 may share one or more processors 22, as well as a portion of the available memory space for use in logical memory 54. In this manner, a given processor 22 may be utilized by more than one logical partition 30.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1 and 2 is not intended to limit the present invention. Indeed, those skilled in the art will recognize that other alternative hardware and/or software environments may be used without departing from the scope of the invention.

Dynamic Platform Optimization

Figure 3:
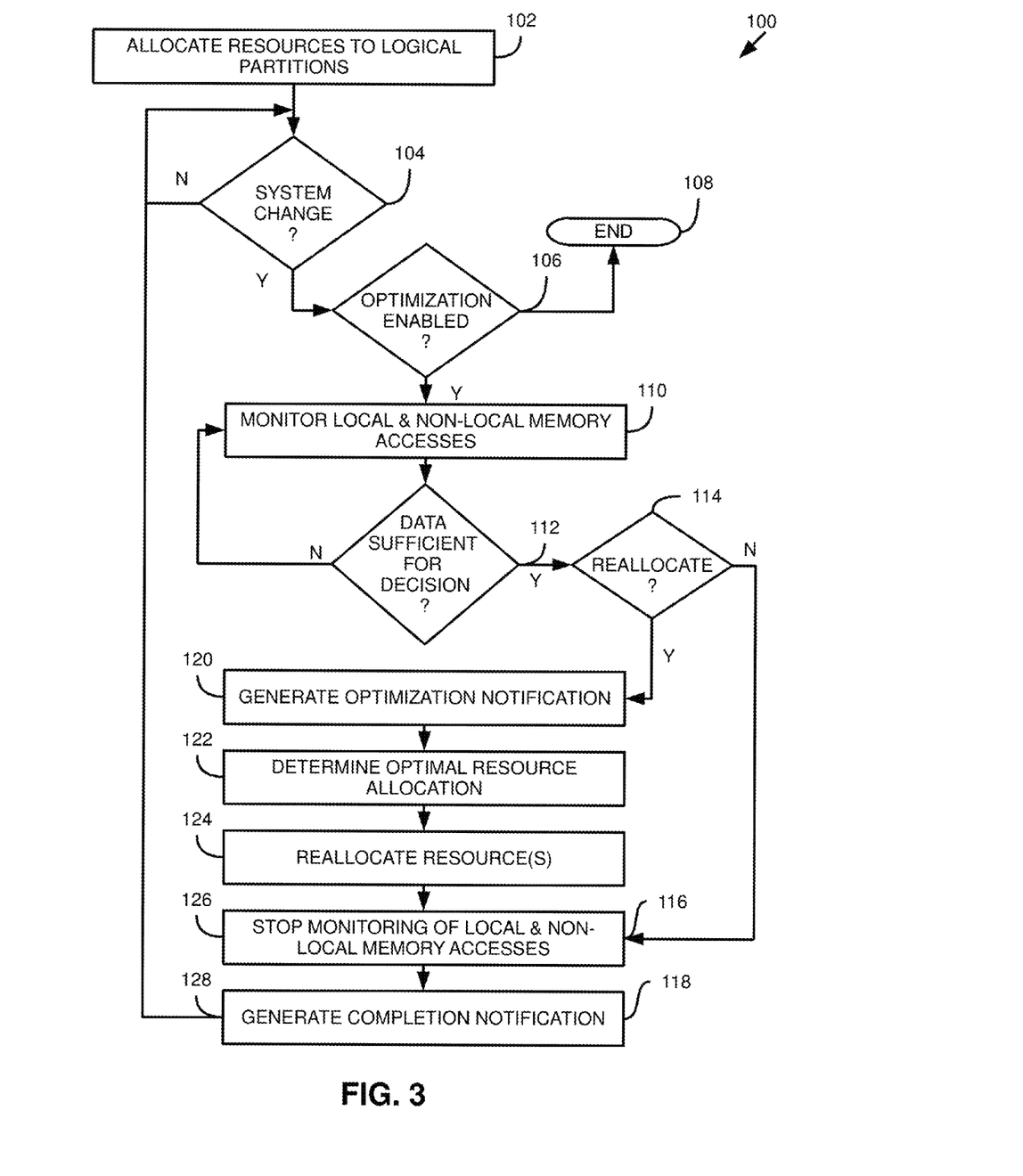
FIG. 3 is a flowchart that illustrates a sequence of operations that may be performed by the data processing system of FIG. 1 to dynamically reallocate resources to one or more logical partitions consistent with some embodiments of the invention.

Embodiments of the invention are generally directed to dynamic platform optimization of a logically partitioned data processing system. FIG. 3 provides flowchart 100 that illustrates a sequence of operations that may be performed by the data processing system 10 consistent with some embodiments of the invention to dynamically optimize the data processing system by dynamically reallocating processor and memory resources for logical partitions. As shown, resources (including processor and memory resources) may be allocated to logical partitions of the data processing system 10 (block 102). In general, the hypervisor may initially allocate resources to logical partitions of the data processing system, where based on available resources, operating system requirements, and/or other such information may be analyzed to allocate processor and memory resources for the logical partitions.

In general, after resources are allocated to logical partitions, the data processing system 10 will be considered to be configured in an optimal resource allocation until a dynamic system resource change occurs. For example, processor and memory resources of a system may become unavailable, or may be removed, added, or repaired; logical partitions may be created, deleted, and/or moved; operating systems may become active, suspended, hibernated; dynamic logical partition operations may add and/or remove processor and memory resources of one or more logical partitions; or other such system changes may occur. Hence, a dynamic system resource change may cause resource allocation for logical partitions to become sub-optimal. Therefore, the data processing system 10 may monitor for system resource changes (block 104). The data processing system 10 may monitor for system resource changes by monitoring state information stored at the hypervisor 32. If a system resource change is not detected ("N" branch of block 104), the data processing system 10 may continue monitoring for a system resource change.

In some embodiments, in response to detecting a dynamic system resource change ("Y" branch of block 104), the data processing system may determine whether the logical partition configuration of the data processing system 10 allows dynamic platform optimization (block 106). If the configuration of the data processing system 10 does not allow dynamic platform optimization ("N" branch of block 106), the data processing system may end dynamic platform optimization operations (block 108).

In response to determining that the configuration of the data processing system 10 does allow dynamic platform optimization ("Y" branch of block 106) and/or in response to detecting a system resource change ("Y" branch of block 104), the data processing system 10 initializes performance monitoring to determine whether or not the system resource change has potentially resulted in a sub-optimal resource allocation, e.g., by monitoring of local and non-local memory accesses (block 110). In some embodiments, a local memory access corresponds to access of a memory resource by a processing resource configured locally with the memory resource, and a non-local memory access corresponds to access of a memory resource not configured locally. For example, in a NUMA-based system, local and non-local memory accesses may respectively correspond to memory accesses to memory devices that are on the same processing node (e.g., the same multi-chip module, the same circuit board, the same slot, etc.) as an accessing processor versus memory devices that are on different processing nodes from an accessing processor. In some embodiments, therefore, local and non-local memory accesses may generally be distinguished as types of memory accesses having different relative access times. In some embodiments of the invention, the hypervisor may collect information for local and non-local memory accesses of each memory resource of each logical partition through interaction with memory controllers of the data processing system.

The hypervisor may monitor the collected information to determine whether the information collected for the local and non-local memory accesses is sufficient to determine whether to reallocate processor and memory resources (block 112). As the memory access information is collected over time, the hypervisor may be configured to wait for sufficient data prior to determining whether to reallocate processor and memory resources. In general, the hypervisor may be configured to collect information for a predefined number of memory accesses and/or for a predefined period of time. In response to determining that sufficient information/data has not been collected ("N" branch of block 112), the hypervisor continues monitoring the local and non-local memory accesses (return to block 110).

In general, embodiments of the invention may utilize affinity counters configured in the memory controllers to detect the local and non-local memory accesses with respect to logical partitions running on processors. The local/non-local affinity counters in the memory controllers may store information for memory accesses, including for example a processor socket identifier that may map to each respective processor. For example, the memory access information may store the processor socket identifier that accessed a given memory page assigned to a memory module (e.g., a memory resource). The hypervisor may analyze this information to determine which processor accessed memory pages of a particular memory module. The memory access information may be collected periodically. The memory access information may then be analyzed by the hypervisor to determine the local memory accesses and also non-local memory accesses for memory pages of each memory module.

In response to determining that sufficient information has been collected ("Y" branch of block 112), the hypervisor determines whether to reallocate processor and memory resources to the logical partitions of the data processing system based at least in part on the local and non-local memory accesses (block 114). In some embodiments, the data processing system 10 (by way of the hypervisor) may determine a ratio (expressed as 'R') of non-local memory accesses (expressed as the variable 'N') to local memory accesses (expressed as the variable 'n') to, such that the ratio may be described as: R=N/n.

The hypervisor may determine whether to reallocate processor and memory resources for the logical partitions of the data processing system based at least in part on the ratio. Moreover, the hypervisor may identify particular processor and memory resources to reallocate. For example, the hypervisor may identify a particular processor associated with non-local memory accesses of a particular memory resource. In this example, reallocation may comprise reallocating a processor resource and/or a memory resource to a different logical partition such that the operating system utilizing the particular processor resource and/or particular memory resource may perform local memory accesses with the reallocated processor and/or memory resources. In general, processor resource reallocation may be more efficient as compared to memory resource reallocation, therefore, the hypervisor may select processing resources to reallocate and memory resources to reallocate based at least in part on computational cost (and therefore computational efficiency).

In response to determining not to reallocate the processor and memory resources ("N" branch of block 114), the data processing system may stop monitoring memory accesses (block 116). The data processing system (by way of the hypervisor) generates a completion notification that may indicate that reallocation is not needed (block 118) and returns to monitoring for system resource changes (return to block 104). In general, if, based on the local memory accesses and non-local memory accesses, a system resource change did not cause a sub-optimal allocation of resources among the logical partitions, state information maintained by the hypervisor may reflect that dynamic platform optimization was not necessary (i.e., the hypervisor generates the completion notification).

In response to determining to reallocate the processor and memory resources (i.e., dynamic platform optimization is needed due to a sub-optimal configuration) ("Y" branch of block 114), the hypervisor generates an optimization notification (block 120). The optimization notification may indicate processor resources and/or memory resources identified for reallocation. The optimization notification may be communicated to any operating systems for which processor and memory resources may be reallocated.

The hypervisor may determine an optimal resource allocation for the logical partitions of the data processing system 10 based at least in part on the local memory accesses and non-local memory accesses (block 122). In general, a hypervisor may access a hardware page table (HPT) of each logical partition of the data processing system. Therefore, each logical partition may access its HPT even during the reallocation/optimization process, where the access may be transparent to the operating systems of the logical partition. In addition, for memory pages that are pinned for input/output (I/O) that may have physical addresses in translation control entity (TCE) tables associated with I/O adapters, the hypervisor may mediate to resolve any contention, since the hypervisor has information about the TCE table, and also the physical addresses of the memory pages that are pinned for I/O.

Consistent with some embodiments of the invention, the hypervisor determines an optimal resource allocation by minimizing the ratio of non-local memory accesses to local memory accesses for the logical partitions. Therefore, minimizing non-local memory accesses to zero (i.e., N=0) may be considered an ideal solution. The hypervisor reallocates processor and memory resources of the data processing system to the logical partitions according to the determined optimal allocation (block 124). In general, reallocation of the processor and memory resources may comprise reallocating at least one processor resource or at least one memory resource from a first logical partition to a second logical partition to thereby reduce non-local memory accesses. In general, optimization of a data processing system may restore processor-memory affinity for logical partitions responsive to system resource changes.

The hypervisor stops monitoring of local and non-local memory accesses (block 116), and the hypervisor generates a completion notification (block 118) that indicates that dynamic platform optimization was performed. To generate the completion notification, the hypervisor may update system state information and return to monitoring for a system resource change (return to block 104).

Figure 4A:
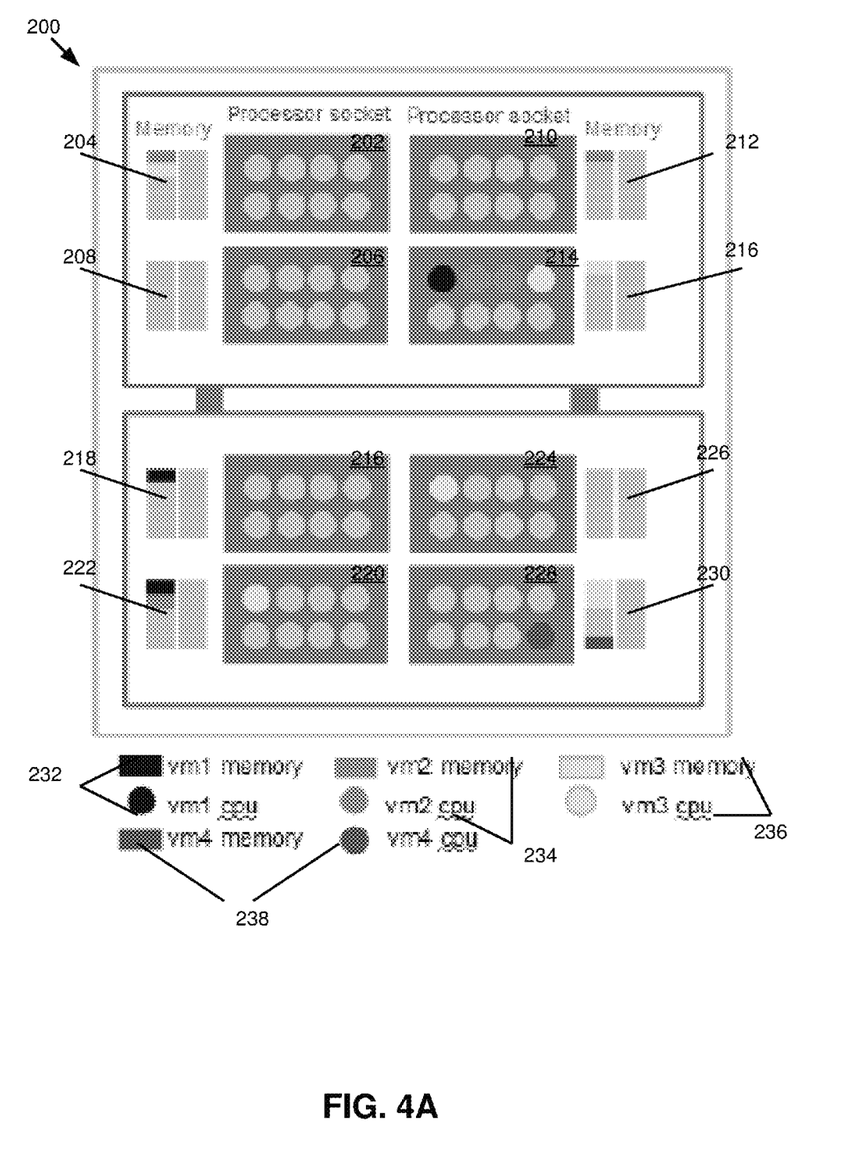
FIGS. 4A-B provide example block diagrams that illustrate an example dynamic reallocation of processor and memory resources that may be performed consistent with embodiments of the invention.
Figure 4B:
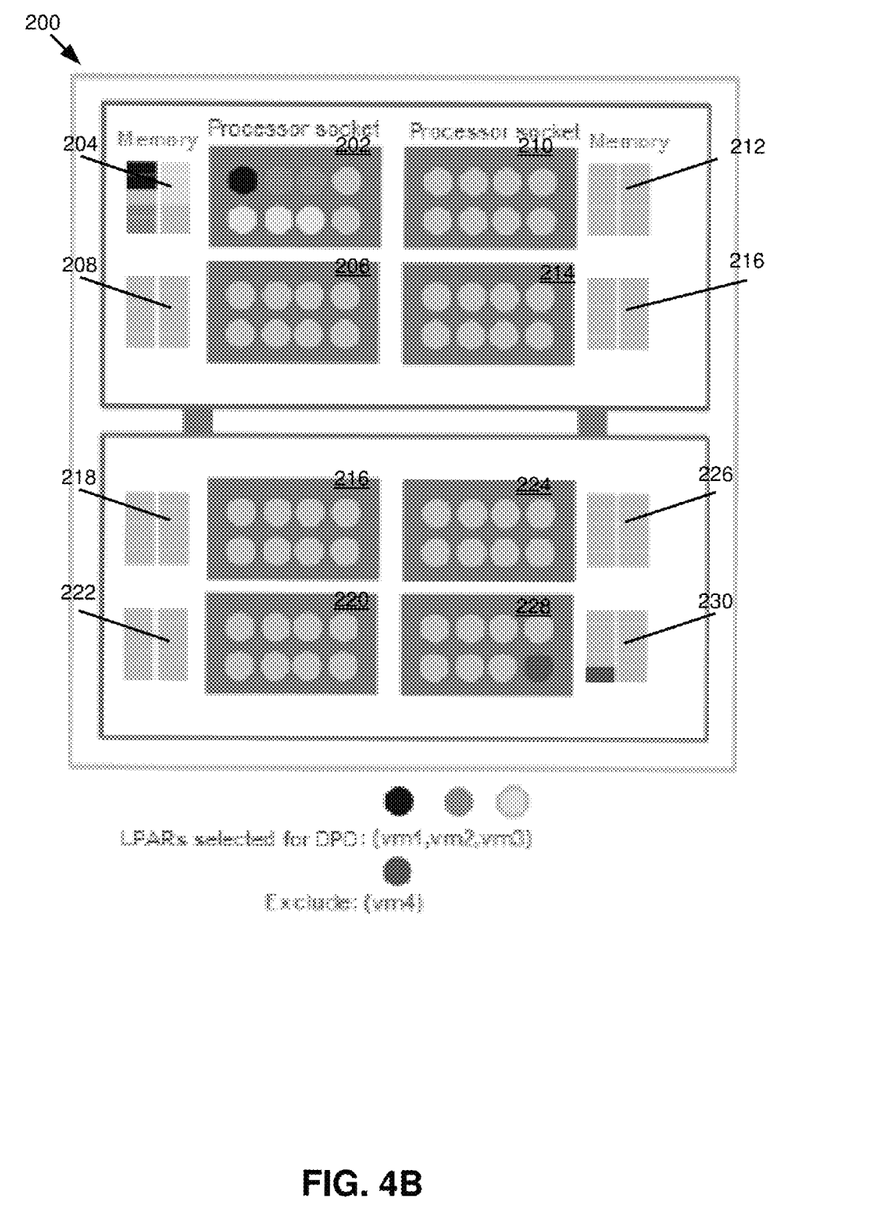

FIGS. 4A-B provide diagrammatic illustrations of an example dynamic platform optimization performed consistent with embodiments of the invention by reallocating processor and memory resources. As shown in FIG. 4A, an example data processing system 200 comprises: a first processor 202 locally associated with a first memory resource 204; a second processor 206 locally associated with a second memory resource 208; a third processor 210 locally associated with a third memory resource 212; a fourth processor 214 locally associated with a fourth memory resource 216; a fifth processor 216 locally associated with a fifth memory resource 218; a sixth processor 220 locally associated with a sixth memory resource 222; a seventh processor 224 locally associated with a seventh memory resource 226; and an eighth processor 228 locally associated with an eighth memory resource 230.

As shown, a first virtual machine ('VM1') 232 is allocated processor and memory resources of the fourth processor 214, the fifth memory resource 218, and the sixth memory resource 222. A second virtual machine ('VM2') 234 is allocated processor and memory resources of the fourth processor 214, the first memory resource 204, the third memory resource 212, and the sixth memory resource 222. A third virtual machine ('VM3') 236 is allocated processor and memory resources of the fourth processor 214, the first memory resource 204, the fourth memory resource 216, the sixth processor 220, the seventh processor 224, and the eighth memory resource 230. A fourth virtual machine ('VM4') 238 is allocated processor and memory resources of the eighth processor 228 and the eighth memory resource 230.

FIG. 4B provides an example of the data processing system of FIG. 4A after dynamic platform optimization. As shown, the first virtual machine 232 has been reallocated processor and memory resources of the first processor 202 and the first memory resource 204 such that the memory accesses of the first virtual machine 232 will be local. The second virtual machine 234 has been reallocated processor and memory resources of the first processor 202 and the first memory resource 204 such that the memory accesses of the second virtual machine 234 will be local. The third virtual machine 236 has been reallocated processor and memory resources of the first processor 202 and the first memory resource 204 such that the memory accesses of the third virtual machine will be local. The fourth virtual machine 238 has not had processor and memory resources reallocated thereto because the fourth virtual machine 238 previously had local processor and memory resources allocated thereto.

Therefore, embodiments of the invention may address shortcomings in data processing technology by performing dynamic platform optimization for data processing systems. In particular, embodiments of the invention may restore processor-memory affinity for allocated processor and memory resources of logically-partitioned data processing systems, thereby increasing efficiency and performance of such data processing systems. Furthermore, embodiments of the invention address shortcomings of conventional systems that may become sub-optimally configured over time. Embodiments of the invention perform dynamic platform optimization of a data processing system automatically and responsive to system resource changes by reallocating processor and memory resources of logical partitions.

While the present invention has been illustrated by a description of various embodiments and while these embodiments have been described in considerable detail, it is not the intention of the applicants to restrict, or in any way limit, the scope of the appended claims to such detail. For instance, another embodiment consistent with the invention supports migration between logical partitions on the same computer. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for dynamically optimizing platform resource allocation of a logically-partitioned data processing system, the method comprising:
   allocating processor and memory resources to a plurality of logical partitions in the logically-partitioned data processing system;
   after allocating processor and memory resources to the plurality of logical partitions in the logically-partitioned data processing system, monitoring local and non-local memory accesses by the plurality of logical partitions;
   determining whether to reallocate the processor and memory resources for the plurality of logical partitions based at least in part on the monitored local and non-local memory accesses; and
   in response to determining to reallocate the processor and memory resources for the plurality of logical partitions, dynamically reallocating the processor and memory resources to the plurality of logical partitions in the logically-partitioned data processing system;
   wherein determining whether to reallocate the processor and memory resources for the plurality of logical partitions is based at least in part on a ratio of non-local memory accesses to local memory accesses for each memory resource of each logical partition.

2. The method of claim 1, further comprising:
   monitoring the data processing system to detect a dynamic system resource change, wherein monitoring local and non-local memory accesses, determining whether to reallocate the processor and memory resources for the plurality of logical partitions, and dynamically reallocating the processor and memory resources to the plurality of logical partitions are performed in response to detecting the dynamic system resource change.

3. The method of claim 2, wherein monitoring the data processing system to detect a dynamic system resource change is based at least in part on state information maintained by the data processing system corresponding to hardware resources of the data processing system.

4. The method of claim 1, wherein determining whether to reallocate the processor and memory resources for the plurality of logical partitions is based at least in part on whether the processor and memory resources are allocated sub-optimally.

5. The method of claim 1, wherein reallocating the processor and memory resources to the plurality of logical partitions in the logically-partitioned data processing system is based at least in part on a ratio of non-local memory accesses to local memory accesses for each memory resource of each logical partition.

6. The method of claim 1, wherein reallocating the processor and memory resources to the plurality of logical partitions in the logically-partitioned data processing system comprises:
   reallocating a particular memory resource to a different logical partition based at least in part a particular processor of the different logical partition being associated with non-local memory accesses of the particular memory resource.

7. The method of claim 1, further comprising:
   in response to dynamically reallocating the processor and memory resources to the plurality of logical partitions in the logically partitioned data processing system, stopping monitoring of local and non-local memory accesses by the plurality of logical partitions.

8. The method of claim 1, further comprising:
   prior to dynamically reallocating the processor and memory resources to the plurality of logical partitions in the logically partitioned data processing system, generating an optimization notification for at least one operating system executing on each logical partition, wherein the optimization notification identifies the processor and memory resources to be reallocated.

9. A method for dynamically optimizing platform resource allocation of a logically-partitioned data processing system, the method comprising:
   allocating processor and memory resources to a plurality of logical partitions in the logically-partitioned data processing system;
   after allocating processor and memory resources to the plurality of logical partitions in the logically-partitioned data processing system, monitoring local and non-local memory accesses by the plurality of logical partitions;
   determining whether to reallocate the processor and memory resources for the plurality of logical partitions based at least in part on the monitored local and non-local memory accesses; and
   in response to determining to reallocate the processor and memory resources for the plurality of logical partitions, dynamically reallocating the processor and memory resources to the plurality of logical partitions in the logically-partitioned data processing system;
   wherein reallocating the processor and memory resources to the plurality of logical partitions in the logically-partitioned data processing system is based at least in part on a ratio of non-local memory accesses to local memory accesses for each memory resource of each logical partition.

10. The method of claim 9, further comprising:
monitoring the data processing system to detect a dynamic system resource change, wherein monitoring local and non-local memory accesses, determining whether to reallocate the processor and memory resources for the plurality of logical partitions, and dynamically reallocating the processor and memory resources to the plurality of logical partitions are performed in response to detecting the dynamic system resource change.

11. The method of claim 10, wherein monitoring the data processing system to detect a dynamic system resource change is based at least in part on state information maintained by the data processing system corresponding to hardware resources of the data processing system.

12. The method of claim 9, wherein determining whether to reallocate the processor and memory resources for the plurality of logical partitions is based at least in part on whether the processor and memory resources are allocated sub-optimally.

13. The method of claim 9, wherein reallocating the processor and memory resources to the plurality of logical partitions in the logically-partitioned data processing system comprises:
reallocating a particular memory resource to a different logical partition based at least in part a particular processor of the different logical partition being associated with non-local memory accesses of the particular memory resource.

14. The method of claim 9, further comprising:
in response to dynamically reallocating the processor and memory resources to the plurality of logical partitions in the logically partitioned data processing system, stopping monitoring of local and non-local memory accesses by the plurality of logical partitions.

15. The method of claim 9, further comprising:
prior to dynamically reallocating the processor and memory resources to the plurality of logical partitions in the logically partitioned data processing system, generating an optimization notification for at least one operating system executing on each logical partition, wherein the optimization notification identifies the processor and memory resources to be reallocated.

* * * * *